(12) United States Patent
Luschek

(10) Patent No.: US 11,377,976 B2
(45) Date of Patent: Jul. 5, 2022

(54) SURFACE COOLER AND METHOD OF FORMING

(71) Applicant: Unison Industries, LLC, Jacksonville, FL (US)

(72) Inventor: Bernard Albert Luschek, Lebanon, OH (US)

(73) Assignee: Unison Industries, LLC, Jacksonville, FL (US)

( * ) Notice: Subject to any disclaimer, the term of this patent is extended or adjusted under 35 U.S.C. 154(b) by 97 days.

(21) Appl. No.: 16/225,096

(22) Filed: Dec. 19, 2018

(65) Prior Publication Data

US 2020/0200041 A1 Jun. 25, 2020

(51) Int. Cl.

| | |
|---|---|
| *F01D 25/14* | (2006.01) |
| *F01D 25/24* | (2006.01) |
| *F01D 25/28* | (2006.01) |
| *B22F 5/00* | (2006.01) |
| *B23P 6/00* | (2006.01) |
| *F02K 3/06* | (2006.01) |
| *B22F 10/20* | (2021.01) |
| *B33Y 80/00* | (2015.01) |
| *B33Y 10/00* | (2015.01) |

(52) U.S. Cl.
CPC .............. *F01D 25/14* (2013.01); *B22F 5/009* (2013.01); *B22F 10/20* (2021.01); *B23P 6/007* (2013.01); *F01D 25/24* (2013.01); *F01D 25/28* (2013.01); *F02K 3/06* (2013.01); *B33Y 10/00* (2014.12); *B33Y 80/00* (2014.12); *F05D 2230/22* (2013.01); *F05D 2230/31* (2013.01); *F05D 2230/80* (2013.01); *F05D 2260/213* (2013.01); *F05D 2260/22141* (2013.01)

(58) Field of Classification Search
CPC ........ F02C 7/12; F02C 7/14; F05D 2260/213; F28D 7/0066
See application file for complete search history.

(56) References Cited

U.S. PATENT DOCUMENTS

| | | | |
|---|---|---|---|
| 8,629,368 B2 | 1/2014 | Mazumder et al. | |
| 9,903,212 B2 | 2/2018 | James | |
| 9,976,596 B2 | 5/2018 | Krebs et al. | |
| 10,035,304 B2 | 7/2018 | Reinarz | |
| 10,066,508 B2 | 9/2018 | Geiger | |
| 10,072,583 B2 | 9/2018 | Peace et al. | |
| 2009/0119860 A1* | 5/2009 | Amsel | B29C 66/21 |
| | | | 15/167.1 |
| 2012/0125594 A1* | 5/2012 | Elder | F28F 17/00 |
| | | | 165/300 |
| 2015/0013142 A1* | 1/2015 | West | B64D 27/26 |
| | | | 29/525.08 |
| 2015/0083367 A1* | 3/2015 | Diaz | F28F 27/02 |
| | | | 165/103 |
| 2016/0023275 A1 | 1/2016 | Propheter-Hinckley et al. | |
| 2016/0333783 A1* | 11/2016 | Weiner | F02C 7/18 |
| 2016/0348548 A1* | 12/2016 | Borghese | F01M 5/02 |
| 2017/0184028 A1* | 6/2017 | Sennoun | F02C 7/12 |

(Continued)

*Primary Examiner* — Henry T Crenshaw
(74) *Attorney, Agent, or Firm* — McGarry Bair PC

(57) ABSTRACT

A surface cooler configured to be operably coupled to an aircraft fan casing and having a first surface configured to confront a peripheral wall of an aircraft fan casing and a second surface opposite the first surface, a set of fluid passages internal to the body and a set of fins located on at least a portion of the second surface of the body.

20 Claims, 5 Drawing Sheets

(56) References Cited

U.S. PATENT DOCUMENTS

| | | |
|---|---|---|
| 2017/0307216 A1 | 10/2017 | Bareiss |
| 2018/0221958 A1 | 8/2018 | Torun et al. |
| 2018/0229430 A1 | 8/2018 | Tyler et al. |
| 2018/0236552 A1* | 8/2018 | Basini .................... B33Y 80/00 |
| 2018/0245605 A1 | 8/2018 | Dreischarf et al. |
| 2018/0245853 A1* | 8/2018 | Sennoun ................ B33Y 80/00 |
| 2018/0245854 A1 | 8/2018 | Sabo et al. |
| 2018/0281284 A1* | 10/2018 | Elgar .................... B29C 64/364 |
| 2020/0149430 A1* | 5/2020 | Cornet ...................... F02C 7/06 |
| 2020/0200040 A1* | 6/2020 | Jiang ........................ F02K 3/06 |

* cited by examiner

SURFACE COOLER AND METHOD OF FORMING

BACKGROUND

Contemporary engines used in aircraft produce substantial amounts of heat that must be transferred away from the engine. Heat exchangers provide a way to transfer heat away from such engines. For example, heat exchangers can be arranged in a ring about a portion of the engine. One type of heat exchanger used is a surface cooler that is mounted to an aft fan casing.

BRIEF DESCRIPTION

Aspects of the present disclosure relate to a surface cooler assembly, including a surface cooler configured to be operably coupled to an aircraft fan casing and having a first surface configured to confront a peripheral wall of an aircraft fan casing and a second surface opposite the first surface, the surface cooler, including a body defining the first surface and the second surface, a set of fluid passages internal to the body and a set of fins located on at least a portion of the second surface of the body; and a first manifold portion unitarily formed with the body and having a first interior passage fluidly coupled to at least one of the set of fluid passages and one of redirects a flow to another of the set of fluid passages or provides an inlet to the at least one of the set of fluid passages.

Another aspect of the present disclosure relates to a method of forming a surface cooler, the method including forming a base body defining a first exterior surface and a second exterior surface opposite the first exterior surface and having a set of fluid passages internal to the base body and wherein the base body is configured to be operably coupled to a fan casing of an aircraft engine and forming a first manifold portion unitarily formed with the base body and having a first interior passage fluidly coupled to at least one of the set of fluid passages and wherein the first interior passage is configured to one of redirect a flow to another of the set of fluid passages or provide an inlet to the at least one of the set of fluid passages.

Yet another aspect of the present disclosure relates to a method of repairing a surface cooler, the method including depositing metal on a portion of a surface cooler assembly, comprising a surface cooler configured to be operably coupled to an aircraft fan casing and having a first surface configured to confront a peripheral wall of an aircraft fan casing and a second surface opposite the first surface, the surface cooler including a body defining the first surface and the second surface, a set of fluid passages internal to the body and a set of fins located on at least a portion of the second surface of the body and at least a first manifold having a first interior passage fluidly coupled to at least one of the set of fluid passages and wherein the first manifold one of redirects a flow to another of the set of fluid passages or provides an inlet to the at least one of the set of fluid passages wherein depositing metal includes laser metal deposition on at least one of a scratch, gouge, or foreign object damage portion of the surface cooler assembly.

DETAILED DESCRIPTION

Figure 1:
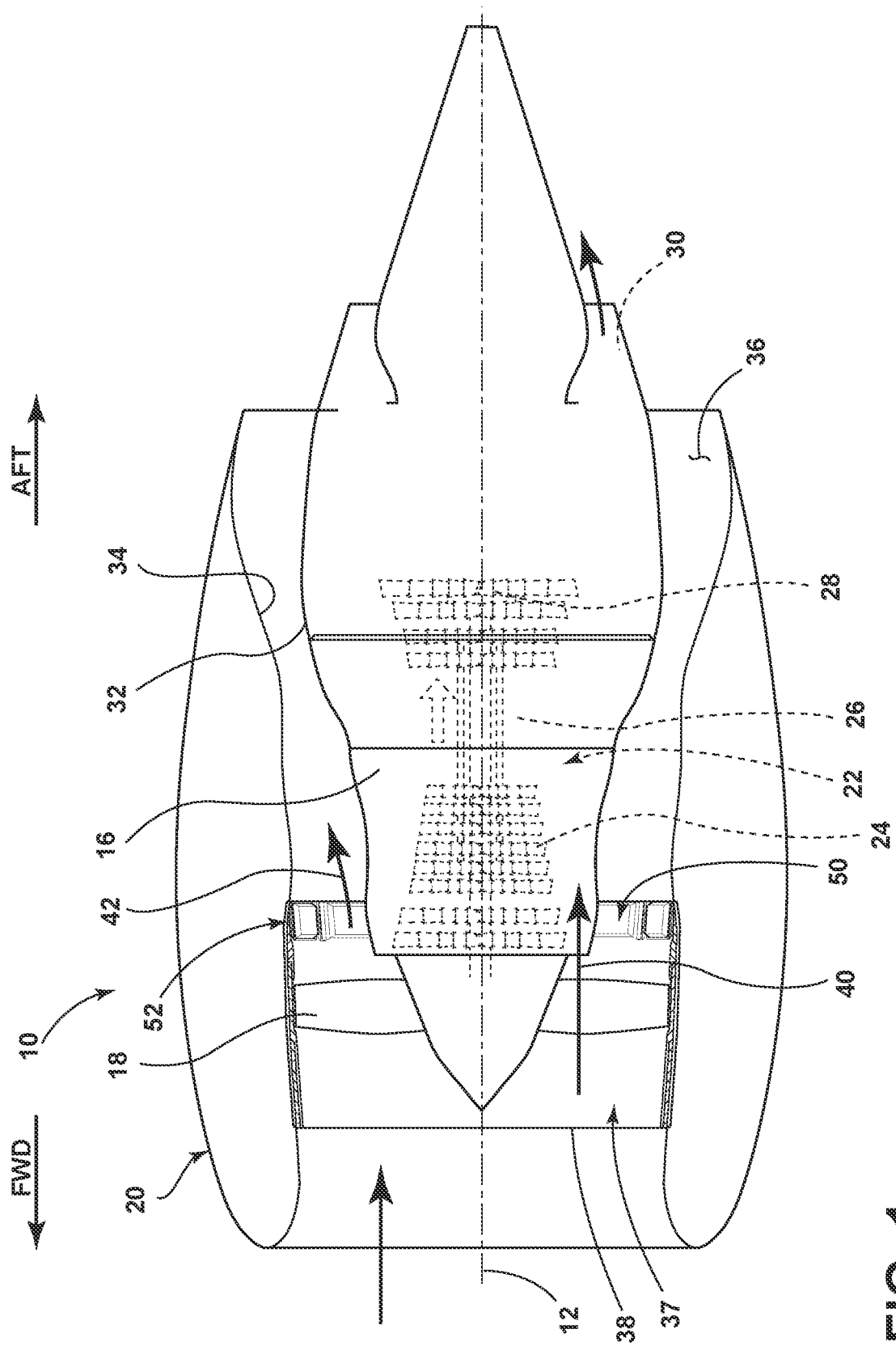
FIG. 1 is a schematic partially cut away view of a turbine engine assembly with a surface cooler in accordance with aspects of the present disclosure.

Aspects of the present disclosure relate to surface coolers for aircraft engines. It will be understood that the space in this region of the engine is limited and current designs utilize nearly all the available space. As a result, newer engine technologies, which have more heat that must be dissipated, will be thermally constrained due to the lack of space available. The problem is further exacerbated in that new engine designs are becoming further space constrained, making the size, and weight of the current types of coolers and their mounting systems prohibitive. An additional problem is that the heat exchangers are subject to relatively harsh environments within the engine relatively high temperatures that cause them to expand thermally, especially laterally or tangential, yet need to remain fixed to the engine to prevent high cycle fatigue from engine vibration. Generally, such heat exchangers are line replaceable units and require servicing while the engine is mounted to the wing of the aircraft. Thus, a mounting system that allows for ease of mounting while still allowing for thermal growth and providing the desired stability is necessary.

The exemplary surface coolers can be used for providing efficient cooling. Further, the term "surface coolers" as used herein can be used interchangeably with the term "heat exchangers." As used herein, the surface coolers are applicable to various types of applications such as, but not limited to, turbojets, turbo fans, turbo propulsion engines, aircraft engines, gas turbines, steam turbines, wind turbines, water turbines, and other automotive or industrial applications. Surface coolers can include, but are not limited to, integrated drive generator surface cooler, variable frequency starter generator cooler, or a lube surface cooler. While "a set of" various elements will be described, it will be understood that "a set" can include any number of the respective elements, including only one element. As used herein, the terms "axial" or "axially" refer to a dimension along a longitudinal axis of a component or along a longitudinal axis of the component. All directional references (e.g., radial, axial, upper, lower, upward, downward, left, right, lateral, front, back, top, bottom, above, below, vertical, horizontal, clockwise, counterclockwise) are only used for identification purposes to aid the reader's understanding of the disclosure, and do not create limitations, particularly as to the position, orientation, or use thereof. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to each other. The exemplary drawings are for purposes of illustration only and the dimensions, positions, order, and relative sizes reflected in the drawings attached hereto can vary.

Thus, referring to FIG. 1, a brief explanation of the environment in which embodiments of the invention can be used is described. More specifically, FIG. 1 illustrates an exemplary turbine engine assembly 10 having a longitudinal axis 12. A turbine engine 16, a fan assembly 18, and a nacelle 20 can be included in the turbine engine assembly 10. The turbine engine 16 can include an engine core 22 having compressor(s) 24, combustion section 26, turbine(s) 28, and exhaust 30. An inner cowl 32 radially surrounds the engine core 22.

Portions of the nacelle 20 have been cut away for clarity. The nacelle 20 surrounds the turbine engine 16 including the inner cowl 32. In this manner, the nacelle 20 forms an outer cowl 34 radially surrounding the inner cowl 32. The outer cowl 34 is spaced from the inner cowl 32 to form an annular passage 36 between the inner cowl 32 and the outer cowl 34. The annular passage 36 characterizes, forms, or otherwise defines a nozzle and a generally forward-to-aft bypass airflow path. A fan casing 37 having an annular forward casing 38 and an annular aft casing 52 can form a portion of the outer cowl 34 formed by the nacelle 20 or can be suspended from portions of the nacelle 20 via struts (not shown).

In operation, air flows through the fan assembly 18 and a first portion 40 of the airflow is channeled through compressor(s) 24 wherein the airflow is further compressed and delivered to the combustion section 26. Hot products of combustion (not shown) from the combustion section 26 are utilized to drive turbine(s) 28 and thus produce engine thrust. The annular passage 36 is utilized to bypass a second portion 42 of the airflow discharged from fan assembly 18 around engine core 22.

The turbine engine assembly 10 can pose unique thermal management challenges and a surface cooler or surface cooler 50 can be attached to the turbine engine assembly 10 to aid in the dissipation of heat. In the exemplary embodiment, the surface cooler 50 is an annular surface cooler that can be operably coupled to an annular aft casing 52 that forms an interior portion of the outer cowl 34.

The surface cooler 50 can be an annular surface cooler located radially about the about turbine engine 16. The surface cooler 50 can include, but is not limited to, an air-cooled heat exchanger that is positioned within the annular passage 36. While the surface cooler 50 has been illustrated as being downstream of the fan assembly 18 it is also contemplated that the surface cooler 50 can alternatively be upstream from fan assembly 18. As such, it will be understood that the surface cooler 50 can be positioned anywhere along the axial length of the annular passage 36. The annular aft casing 52 and surface cooler 50 can form a portion of a fan casing assembly.

Figure 2:
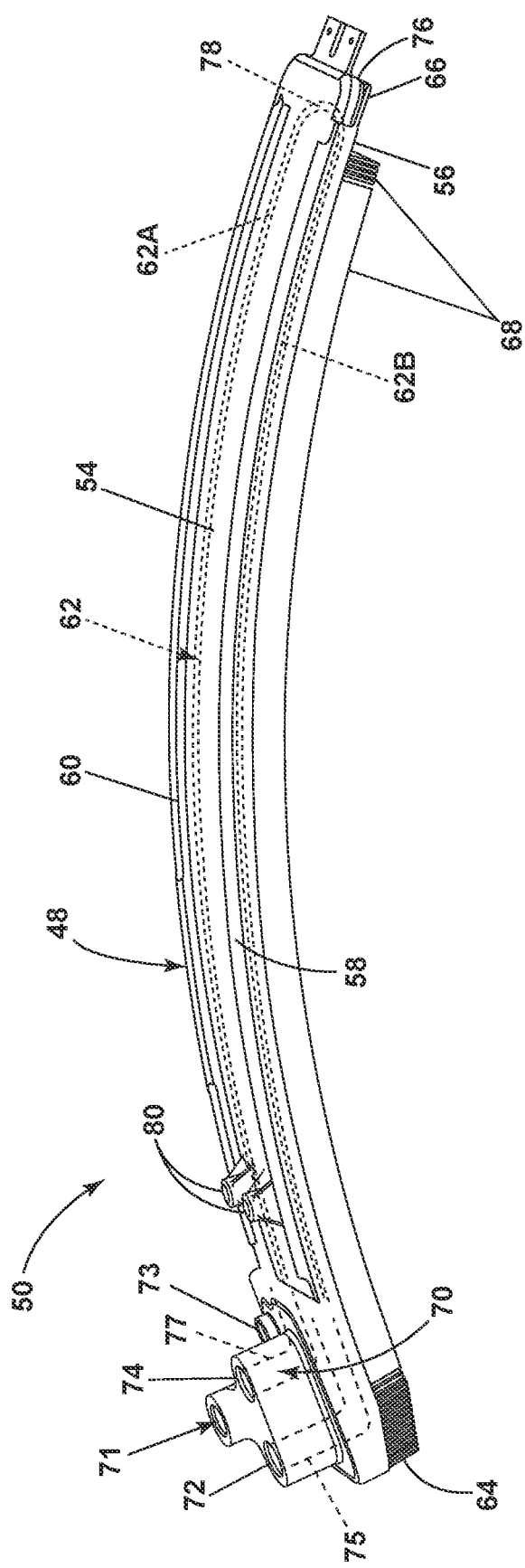
FIG. 2 is a perspective view of a portion of a surface cooler that can be included in the turbine engine assembly of FIG. 1.

FIG. 2 illustrates one exemplary embodiment of a portion of the surface cooler 50 having a body 48 defining a first surface 54 and a second surface 56 that is opposite that of the first surface 54. When assembled, the first surface 54 confronts the annular aft casing 52. The surface cooler 50 can include a circumferential and axial profile that is substantially similar to the circumferential and axial profile of the annular aft casing 52. It will be understood that the surface cooler 50 can cover any portion of the circumference of the annular aft casing 52. It will be understood that a set of surface coolers 50 can be utilized to cool a single turbine engine assembly 10. The first surface 54 has been illustrated as including a forward edge projection 58 and an aft edge projection 60. Although it will be understood that this need not be the case. Such forward edge projection 58 and aft edge projection 60 can be used for mounting the surface cooler 50 to hooks or other mounting features of the annular aft casing 52.

Generally, a set of fluid passages or cooling passages 62 extend at least a portion of a length of the body 48 from a first distal end 64 to a second distal end 66. It will be understood that any number of cooling passages can be located internally of the body 48. A first fluid passage 62A and a second fluid passage 62B in the set of fluid passage 62 have been illustrated in FIG. 2 for the sake of clarity.

A set of fins 68 define a portion of the second surface 56 of the body 48. It will be understood that while some of the fins 68 have been shown as being more discrete and some of the fins 68 have been shown as a longer solid body that any suitable type, size, profile, and shape are contemplated. Further still, the longer solid body is merely for clarity sake, and it will be understood that only discrete fins can be included. In one non-limiting example, the fins 68 can include thin metal shavings skived from the body 48.

A first manifold portion or inlet/outlet manifold portion 70 is included in the body 48 at the first distal end 64 and includes an inlet 72, an outlet 74, a first interior passage 75, and a second interior passage 77. The inlet 72 can be fluidly coupled to at least one of the set of cooling passages 62, such as via the first interior passage 75, to provide hot liquid thereto. The outlet 74 is fluidly coupled to another of at least one of the set of cooling passages 62, such as via the second interior passage 77, to direct hot liquid therefrom. In this manner, it will be understood that the inlet/outlet manifold portion 70 overlies or is adjacent to at least a portion of the set of cooling passages 62. A bypass valve section 71 can be fluidly coupled such that hot liquid introduced bypasses the set of cooling passages 62 and is not cooled. A first attachment boss 73 is also illustrated as being included and can be utilized to operably couple the annular aft casing 52 and surface cooler 50.

Further still, in the illustrated example, fins 68 are located on the second surface 56 opposite the location of the inlet/outlet manifold portion 70. This allows for heat to be directed out of fluid that is within the inlet/outlet manifold portion 70. Alternatively, it will be understood that fins need not be located on the second surface opposite the location of the inlet/outlet manifold portion 70.

By way of non-limiting example, fins are not located opposite of a second manifold portion or return manifold portion 76 of the body 48. It will be understood, however, that they can be located on the second surface 56 further towards or adjacent the second distal end 66. The return manifold portion 76 is also unitarily formed with the body 48 and includes a third interior fluid passage in the form of a return fluid passage 78 fluidly coupled to at least two of the set of cooling passages 62 to fluidly couple them together. The return manifold portion 76 is configured to redirect a direction of fluid flow from one fluid passage 62A of the set of cooling passages 62 to the second fluid passaage 62B of the set of cooling passages 62.

A set of mounting bosses 80 can be included on the first surface 54. The set of mounting bosses 80 can be unitarily formed with the body 48 and can be utilized to operably couple the annular aft casing 52 and surface cooler 50. It will be understood that the mounting boss 80 can take any number of suitable shapes and sizes.

Figures 3, 4:
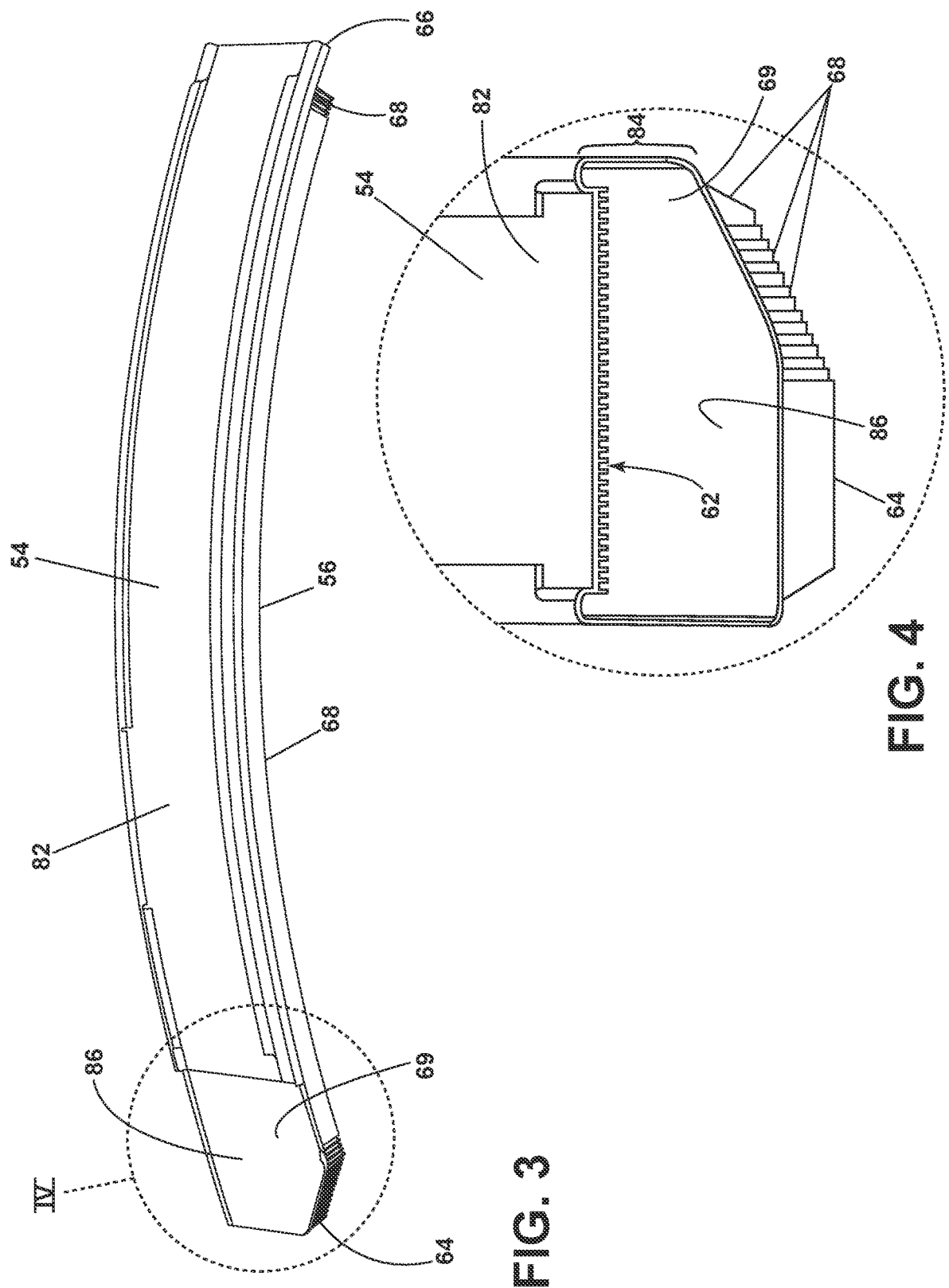
FIG. 3 is a perspective view of a base body that can be used to form the surface cooler of FIG. 2.
FIG. 4 is an enlarged perspective view of a portion of the base body of FIG. 3.

Aspects of the present disclosure include the forming of the body 48 including the integral unitarily formed inlet/outlet manifold portion 70, the integral unitarily formed return manifold portion 76, and the integral unitarily formed mounting bosses 80. The process of forming can start with forming the base body as illustrated in FIG. 3. It will be understood that any of the suitable portions of the base body 82 as described in FIG. 2 can be initially be formed as part of the base body 82 including, but not limited to, the first surface 54, second surface 56, first distal end 64, second distal end 66, set of cooling passages 62, or fins 68. The initial base body 82 can be an aluminum base body, by way of non-limiting example, that is extruded with such features. Alternatively, the base body 82 can be formed in any other suitable manner. Alternatively or additionally, additional material can be extruded on the second surface 56 such that the set of fins 68 can be formed from the additional material, such as via skiving.

It is contemplated that a first portion of the base body 82 can be removed, this has been indicated generally at 84. Removal of the first portion forms a depression 86 in the base body 82 and the first surface 54. It is contemplated that the set of cooling passages 62 can also be removed from the base body 82 to form the depression 86, leaving only the fins 68 and a fin-wall 69 joining the fins 68 together as more clearly shown in FIG. 4. The removal can be done in any manner including that the base body 82 can be machined away by way of non-limiting example.

Inlet/outlet manifold portion 70 can then be unitarily formed with a remainder of the base body 82 including onto the depression 86 and operably coupled with exposed cooling passages 62. It is contemplated that the inlet/outlet manifold portion 70 can be unitarily formed with a remainder of the base body 82 in any suitable manner including via additive manufacturing technologies such as electrodeposition or laser metal deposition technology (LMDT).

Figure 5:
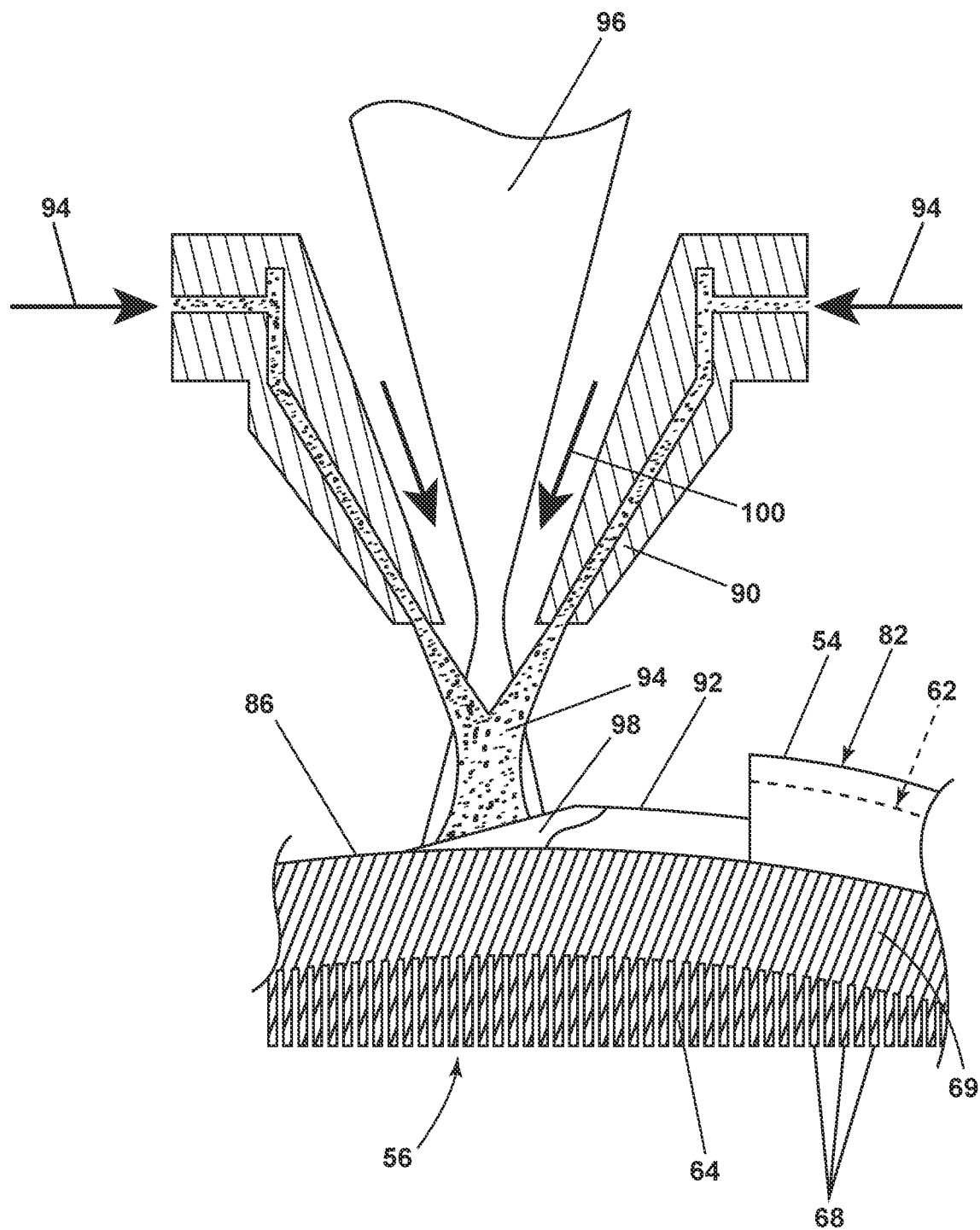
FIG. 5 is a schematic view illustrating laser metal deposition on a portion of the base body of FIG. 4.

FIG. 5 more clearly illustrates the inlet/outlet manifold portion 70 being constructed via LMDT. More specifically, in LMDT a nozzle 90 is utilized to deposit material 92 onto the depression 86 of the base body 82 to build the inlet/outlet manifold portion 70 onto the base body 82 such that the body 48 is an integrally formed unitary monolithic body. The layers of deposit material 92 are shaped such that the inlet/outlet manifold portion 70 are built onto the base body 82 so that the inlet 72 and outlet 74 (FIG. 2) of the inlet/outlet manifold portion 70 are sealingly fluidly coupled with cooling passages 62, respectively.

As shown in FIG. 5, the LMDT works by injecting metal powder 94 via the nozzle 90 into a laser beam 96 that converges on the surface of the depression 86 and forms a melt pool 98. Shield gasses can also be utilized separately as indicated with arrows 100 or in combination with the metal powder 94 fed through the nozzle 90. One benefit of such additive manufacturing techniques is that the inlet/outlet manifold portion 70 can be unitarily formed with the base body 82. It will be understood that the depression 86 and the base body 82 including the first surface 54 are curved surfaces as the surface cooler 50 is an annular surface cooler configured to surround an engine. Such curved surfaces can be considered complex surfaces in which not all additive manufacturing techniques can be applied. It is also contemplated that LMDT can be utilized to unitarily form the boss(es) 80 (FIG. 2) with the base body 82. The boss(es) 80 could be printed via LMDT as solid structures and then be drilled and tapped for staked inserts (not shown).

It will be understood that once the surface cooler has been fully formed it can then be positioned such that the first surface 54 confronts the annular aft casing 52. The body 48 can then be fixed to and extended from the annular aft casing 52 by the bosses 80 or any other suitable fastening mechanism. In this manner, the body 48 can be suspended from the annular aft casing 52.

Figure 6:
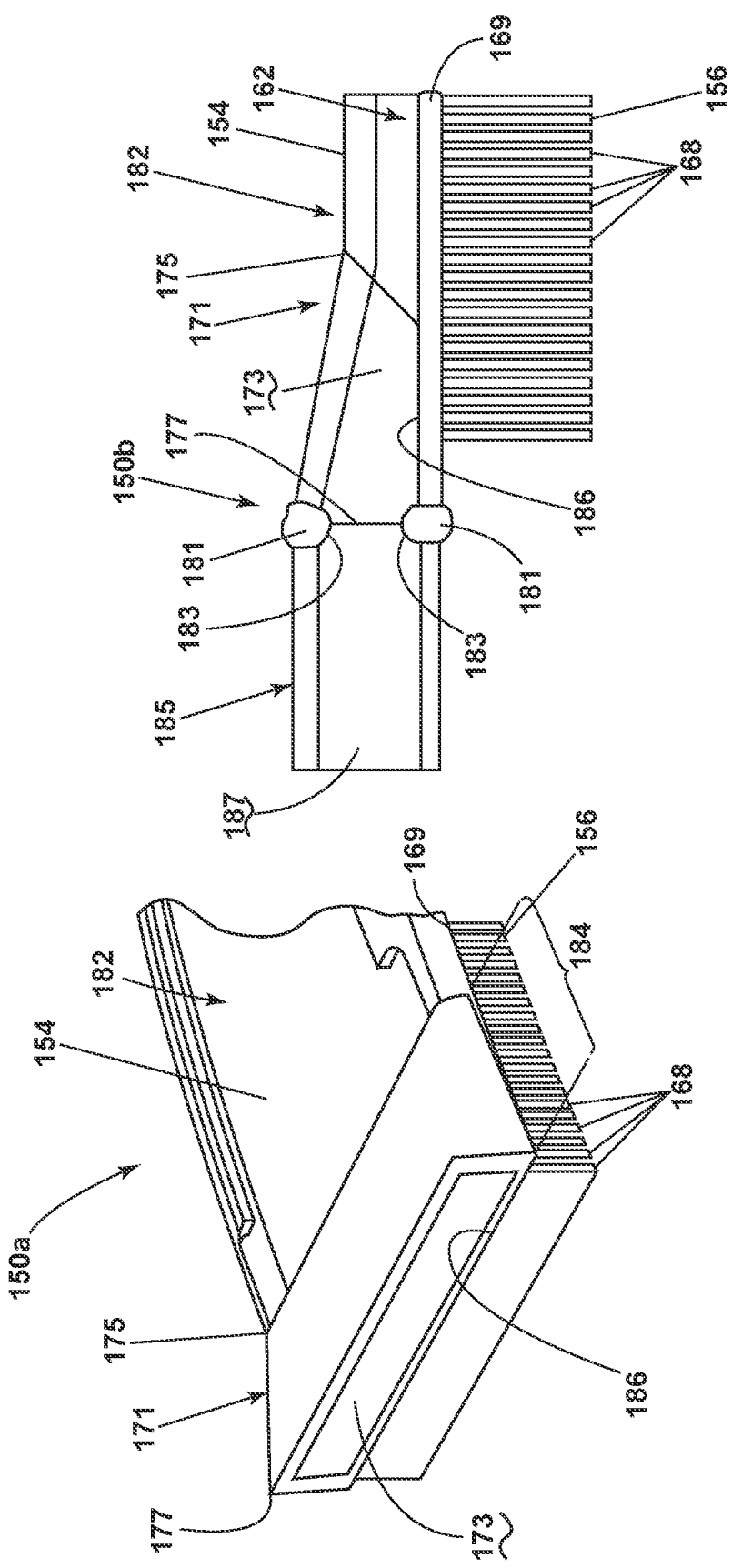
FIG. 6 illustrates cross-sectional views of portions of a surface cooler that can be included in the turbine engine assembly of FIG. 1.

FIG. 6 illustrates another alternative method of forming a portion of a surface cooler 150a, 150b. The surface cooler 150a, 150b is similar to the surface cooler 50; therefore, like parts will be identified with like numerals increased by 100, with it being understood that the description of the like parts of the surface cooler 50 applies to the surface cooler 150a, 150b, unless otherwise noted. In the illustrated example, much like the earlier described process, the process of forming the surface cooler as illustrated at 150a can start with forming a base body 182, which can include including the first surface 154, second surface 156, set of cooling passages 162, and fins 168. Again, the base body 182 can be extruded with such features. Alternatively or additionally, additional material can be extruded on the second surface 56 such that the set of fins 168 can be formed there from such as via skiving.

A first portion of the base body 182 can be removed, this has been indicated generally at 184, to form a depression 186 in the base body 182 and the first surface 154. It is contemplated that the removed portion 184 can include that the set of cooling passages 162 can also be removed from the base body 182 to form the depression 186 leaving only the fins 168 and fin-wall 169.

Also illustrated is that an expander body 171 having a set of fluid passages 173 can then be unitarily formed onto the depression 186 and operably coupled with exposed cooling passages 162. It is contemplated that the expander body 171 can be unitarily formed with the base body 182 in any suitable manner including via additive manufacturing technologies such as electrodeposition or laser metal deposition technology (LMDT). While only a single fluid passage 173 has been illustrated for clarity it will be understood that the expander may have a same number of fluid passages as the cooling passages 162. Alternatively, the number of fluid passages 173 can be different than the number of cooling passages 162. As illustrated it is contemplated that the expander body 171 allows for a height of the fluid passages to be increased over a length of the unitarily formed expander body 171 from a first portion 175 to a second portion 177 of the expander body 171. This includes that the interior height of the fluid passages 173 therein can also be increased as better shown in the cross-section at 150b.

The surface cooler 150b also illustrates that an inlet/outlet manifold 185 has been welded at weld joints 181 to the expander body 171. The weld joints 181 run along upper and lower portions of the inlet/outlet manifold 185 and the expander body 171. Material from the weld joints 181 can extend into the fluid passage 187 of the inlet/outlet manifold 185 and the fluid passage 173 of the expander body 171. Such material 183 is often called weld-drop-through. In operation, if the fluid passages did not have the increase in height provided by the expander body 181 the weld-drop-through would hinder the flow of fluid during operation. Essentially, the weld-drop-through would otherwise cause a constriction and narrow the fluid passage causing a pressure change the surface cooler. However, the inclusion of the unitarily formed expander body 171 allows a manifold 185 having larger channels to be welded to the base body 182 lessening the impact of any weld-drop-through. In this manner the expander body 171 allows welding but avoids excessive oil-side pressure drop by allowing for a transition in height between the base body 182 to the inlet/outlet manifold 185.

Alternatively, it has been determined that instead of removing an upper portion of the base body to create a depression as previously described and illustrated that slots or other channels can be machined, including via wire EDM, into the upper surface as necessary to provide access to the cooling passages 62. LMDT could also be utilized to provide strengthening features within a portion of the surface cooler including within the machined channels. Further still LMDT could be used on the surface coolers described herein to add additional surface area features to maximize heat transfer.

It has also be contemplated that LMDT can be utilized for joining of parts or portions on a surface cooler such as those described above. For example, LMDT could be utilized to fluidly attach manifolds such as inlet/outlet manifold or return manifold to a curved cooling passage sections of a surface cooler to replace typical welding or brazing. In this manner aspects of the present disclosure enable or provide for controlling weld-drop-through so to minimize or eliminate drop-through in the fluid passage at the weld joint. This can be particularly beneficial in heat exchangers where pressure changes can be damaging. Aspects of the present disclosure have been specifically describe with respect to high pressure heat exchangers including surface coolers in an engine such as an aircraft engine. Such heat exchangers can operate at pressures from ~20 atm to 68 atm (~300 psi to 1000 psi). Because LMDT creates a small melt pool at the surface of deposition weld-drop-through into the fluid passages themselves can be avoided. While this can be beneficial in many types of components it has been found of particular benefit in heat exchangers including those of high pressure such as aircraft surface coolers. Aspects of the present disclosure allows smaller channel heights because space does not need to be left for drop-through this in turn results in oil velocity maximization and better heat transfer coefficients. This also allows for the surface coolers to be smaller and to fit better into the tightly designed spaces and for them to have less weight. Because aspects of the present invention have a reduction of pressure changes they allow for components to be formed with thinner walls allowing for better heat transfer and additional weight reduction, which is particularly beneficial in aircraft as it directly relates to fuel consumption and cost benefits.

LMDT could also be used for repair of surface coolers or other complex parts or heat exchangers and is not restricted to typical additive processes that require flat powder beds. This can be particularly beneficial as LMDT can be utilized to repair surface coolers returning from field operation with scratches, gouges, or foreign object damage.

The above-described embodiments provide for a compact and simplified design that provides a variety of additional benefits including ease of assembly and that no welding is required. Further, the simplified design provides a variety of additional benefits including elimination of expensive cast manifolds, elimination of weld-drop-through, and unitarily formed attachments. Aspects of the present disclosure also provide for a repair option for returned surface coolers.

To the extent not already described, the different features and structures of the various embodiments can be used in combination with each other as desired. That one feature is not illustrated in all of the embodiments is not meant to be construed that it cannot be, but is done for brevity of description. Thus, the various features of the different embodiments can be mixed and matched as desired to form new embodiments, whether or not the new embodiments are expressly described. All combinations or permutations of features described herein are covered by this disclosure.

This written description uses examples to disclose the invention, including the best mode, and also to enable any person skilled in the art to practice the invention, including making and using any devices or systems and performing any incorporated methods. The patentable scope of the invention is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A surface cooler assembly configured to be operably coupled to an aircraft fan casing, the surface cooler assembly comprising:
   a surface cooler including a curved body having a first surface configured to confront the aircraft fan casing and a second surface opposite the first surface, the surface cooler comprising:
   multiple fluid passages internal to the curved body;
   a set of fins located on the second surface of the curved body;
   a manifold portion unitarily formed with the curved body and comprising a first interior passage having a section extending in a radial direction with respect to the curved body, with the first interior passage spaced from the set of fins and fluidly coupled to the multiple fluid passages and providing an inlet to the multiple fluid passages; and
   an attachment boss unitarily formed with the curved body and configured to couple the curved body to the aircraft fan casing.

2. The surface cooler assembly of claim 1, further comprising a return manifold portion unitarily formed with the body and having a third interior passage fluidly coupled to at least two fluid passages of the multiple fluid passages and configured to redirect a flow of fluid from one fluid passage of the at least two fluid passages to the other fluid passage of the at least two fluid passages.

3. The surface cooler assembly of claim 2 wherein the second surface underlying the return manifold is devoid of fins.

4. The surface cooler assembly of claim 2 wherein the surface cooler is an air cooled oil cooler.

5. The surface cooler assembly of claim 2, wherein the manifold portion is located at a first end of the curved body and the return manifold portion is located at a second end of the curved body opposite the first end.

6. The surface cooler assembly of claim 5, further comprising a second attachment boss unitarily formed with the curved body and positioned between the first end and the second end.

7. The surface cooler assembly of claim 1 wherein the manifold portion comprises an expander body and the first interior passage extends from a first end of the expander body to a second end of the expander body.

8. The surface cooler assembly of claim 7 wherein the first interior passage includes a first height at the first end and a second height at the second end and wherein the first height is larger than the second height.

9. The surface cooler assembly of claim 8, further comprising a cast manifold mounted to the first end of the expander body.

10. The surface cooler assembly of claim 1, wherein the first interior passage is spaced from the set of fins in the radial direction.

11. The surface cooler assembly of claim 1, further comprising a second interior passage within the manifold portion fluidly coupled to at least one other fluid passage of the multiple fluid passages and providing an outlet to the multiple fluid passages.

12. The surface cooler assembly of claim 11 wherein the manifold portion includes fins located on the portion of the second surface of the body opposite the inlet and the outlet.

13. A method of repairing the surface cooler assembly of claim 1, the method comprising depositing metal on a portion of the surface cooler assembly, wherein depositing metal includes laser metal deposition on at least one of a scratch, gouge, or foreign object damage portion of the surface cooler assembly.

14. The surface cooler assembly of claim 1, wherein the attachment boss is located at the manifold portion adjacent the inlet.

15. The surface cooler assembly of claim 1, further comprising a bypass valve section located on the manifold portion and fluidly separated from the multiple fluid passages such that fluid flowing through the bypass valve section does not enter the multiple fluid passages.

16. A surface cooler assembly configured to be operably coupled to an aircraft fan casing, the surface cooler assembly comprising:
    a surface cooler including a body having a first surface configured to confront the aircraft fan casing and a second surface opposite the first surface, the surface cooler comprising:
        a set of fluid passages internal to the body;
        a set of fins extending from a first portion of the second surface of the body;
        a return manifold portion unitarily formed with the body and comprising a return interior passage fluidly coupling a first fluid passage of the set of fluid passages to a second fluid passage of the set of fluid passages and redirecting a fluid flow from the first fluid passage to the second fluid passage by way of the return interior passage; and
        an attachment boss unitarily formed with the body and configured to couple the body to the aircraft fan casing;
    wherein the return interior passage overlies a second portion of the second surface of the body which is devoid of fins.

17. The surface cooler assembly of claim 16, wherein the attachment boss is located at a first end of the body, and wherein the return manifold portion is located at a second end of the body opposite the first end.

18. A method of forming a surface cooler, the method comprising:
    forming a curved base body defining a first exterior surface and a second exterior surface opposite the first exterior surface, and the curved base body having a first fluid passage and a second fluid passage both internal to the curved base body, wherein the first exterior surface is configured to be operably coupled to a fan casing of an aircraft engine;
    forming fins extending from a portion of the second exterior surface of the curved base body;
    forming a manifold unitarily with the curved base body having an interior passage fluidly coupled to at least the first fluid passage, with the interior passage spaced from the fins, wherein the interior passage of the manifold comprises:
        a first section overlying a portion of the second exterior surface that is devoid of fins, and providing flow redirection from the first fluid passage to the second fluid passage; or
        a second section, different from the first section and extending in a radial direction with respect to the curved base body, providing an inlet to the at least the first fluid passage; and
    forming an attachment boss unitarily with the curved base body at the manifold, with the attachment boss configured to couple the curved base body to the fan casing.

19. The method of claim 18 wherein forming the curved base body comprises extruding the curved base body.

20. The method of claim 19 wherein forming the manifold comprises building the manifold via laser metal deposition.

* * * * *